(12) United States Patent
Vemulapati et al.

(10) Patent No.: US 10,583,760 B2
(45) Date of Patent: Mar. 10, 2020

(54) ARMREST AND SUPPORT FOR AN ARMREST ASSEMBLY

(71) Applicant: FORD GLOBAL TECHNOLOGIES, LLC, Dearborn, MI (US)

(72) Inventors: Satyanarayana Raju Vemulapati, Westland, MI (US); Bhavani Thota, Novi, MI (US); Deepak Patel, Canton, MI (US); Zhibing Deng, Northville, MI (US); Linh Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/003,529

(22) Filed: Jun. 8, 2018

(65) Prior Publication Data
US 2019/0375323 A1    Dec. 12, 2019

(51) Int. Cl.
*B60N 2/75* (2018.01)
*B60N 2/70* (2006.01)

(52) U.S. Cl.
CPC ........ *B60N 2/75* (2018.02); *B60N 2/70* (2013.01)

(58) Field of Classification Search
CPC ................... B60N 2/70; B60N 2/75
USPC ................... 297/411.2–411.46
See application file for complete search history.

(56) References Cited

U.S. PATENT DOCUMENTS

| | | | | |
|---|---|---|---|---|
| 3,362,749 A * | 1/1968 | Clement | ........... | B60N 2/78 297/411.21 |
| 3,387,881 A * | 6/1968 | Stepanek | ........... | B60N 2/78 297/411.21 X |
| 4,867,500 A * | 9/1989 | Oosterbaan | ........... | B60J 3/0278 297/411.46 X |
| 5,154,445 A * | 10/1992 | Weller | ........... | B60R 21/0428 280/751 |
| 5,181,759 A * | 1/1993 | Doolittle | ........... | B60N 3/02 297/411.21 X |
| 5,290,087 A * | 3/1994 | Spykerman | ........... | B60N 2/757 297/411.21 X |
| 5,395,161 A * | 3/1995 | Spykerman | ........... | B60N 2/70 297/411.2 |
| 5,445,430 A * | 8/1995 | Nichols | ........... | B60N 2/78 297/411.21 X |
| 5,527,084 A * | 6/1996 | Scherf | ........... | B60R 21/0428 297/411.21 X |
| 5,573,272 A * | 11/1996 | Teshima | ........... | B60R 21/0428 280/751 |

(Continued)

FOREIGN PATENT DOCUMENTS

WO    2013156098 A1    10/2013

OTHER PUBLICATIONS

English Machine Translation of WO2013156098A1.

*Primary Examiner* — Rodney B White
(74) *Attorney, Agent, or Firm* — David Coppiellie; King & Schickli, PLLC

(57) ABSTRACT

A support for an armrest assembly includes a plurality of interconnected ribs. One or more of those ribs has (a) a first section, having a first proximal end and a first distal end, (b) a second end section, having a second proximal end and a second distal end, and (c) an intermediate section connecting the first distal end and the second distal end. The first end section and the second end section are offset. An armrest assembly includes a body, the support, a cushioning layer overlying the support and a cover layer overlying the cushioning layer.

16 Claims, 7 Drawing Sheets

(56) References Cited

U.S. PATENT DOCUMENTS

| | | | |
|---|---|---|---|
| 5,716,093 A * | 2/1998 | Sadr | B60R 21/0428 296/146.6 |
| 5,769,496 A * | 6/1998 | Gryp | A47C 1/03 297/411.32 |
| 5,984,416 A * | 11/1999 | Waldo | A47C 1/03 297/411.38 |
| 6,168,236 B1 * | 1/2001 | Chen | A47C 7/546 297/411.2 |
| 6,382,726 B2 * | 5/2002 | Bullesbach | B60N 2/767 297/411.38 |
| 6,568,743 B1 * | 5/2003 | Jayasuriya | B60N 2/42727 296/153 |
| 6,607,243 B2 * | 8/2003 | Kain | B60N 2/28 297/411.2 Z |
| 6,893,077 B1 | 5/2005 | DeJongh | |
| 7,226,113 B2 * | 6/2007 | Dreier | B60N 2/78 296/153 |
| 7,775,584 B2 * | 8/2010 | Hughes, Jr. | B60N 2/78 296/187.05 |
| 7,794,009 B2 * | 9/2010 | Pinkerton | B60N 2/4235 296/153 |
| 7,794,010 B2 | 9/2010 | Saida et al. | |
| 7,828,388 B2 * | 11/2010 | Thomas | B60N 2/4235 297/411.21 |
| 8,157,309 B2 * | 4/2012 | Ishikawa | B60R 21/0428 296/1.08 |
| 8,172,311 B2 | 5/2012 | Hughes, Jr. et al. | |
| 8,424,954 B2 * | 4/2013 | Hall | B60N 2/4235 296/153 |
| 8,535,584 B2 | 9/2013 | Tsuda et al. | |
| 9,114,773 B2 * | 8/2015 | Sundararajan | B60N 2/78 |
| 9,463,723 B2 * | 10/2016 | Hamdoon | B60N 2/4235 |
| 9,481,274 B2 * | 11/2016 | Laird | B60N 2/42709 |
| 9,610,873 B2 | 4/2017 | Jayasuriya et al. | |
| 9,956,855 B2 * | 5/2018 | Tamaoki | B60J 5/0416 |
| 9,981,575 B2 * | 5/2018 | Hamdoon | B60N 2/4235 |
| 2007/0267910 A1 * | 11/2007 | Bergin | A47C 7/546 297/411.26 |
| 2012/0146381 A1 * | 6/2012 | Spooner | A47C 7/546 297/411.46 |
| 2015/0360784 A1 * | 12/2015 | Maslakow | B64D 11/0644 297/411.2 |
| 2016/0059678 A1 * | 3/2016 | Tamaoki | B60J 5/0416 49/501 |

* cited by examiner

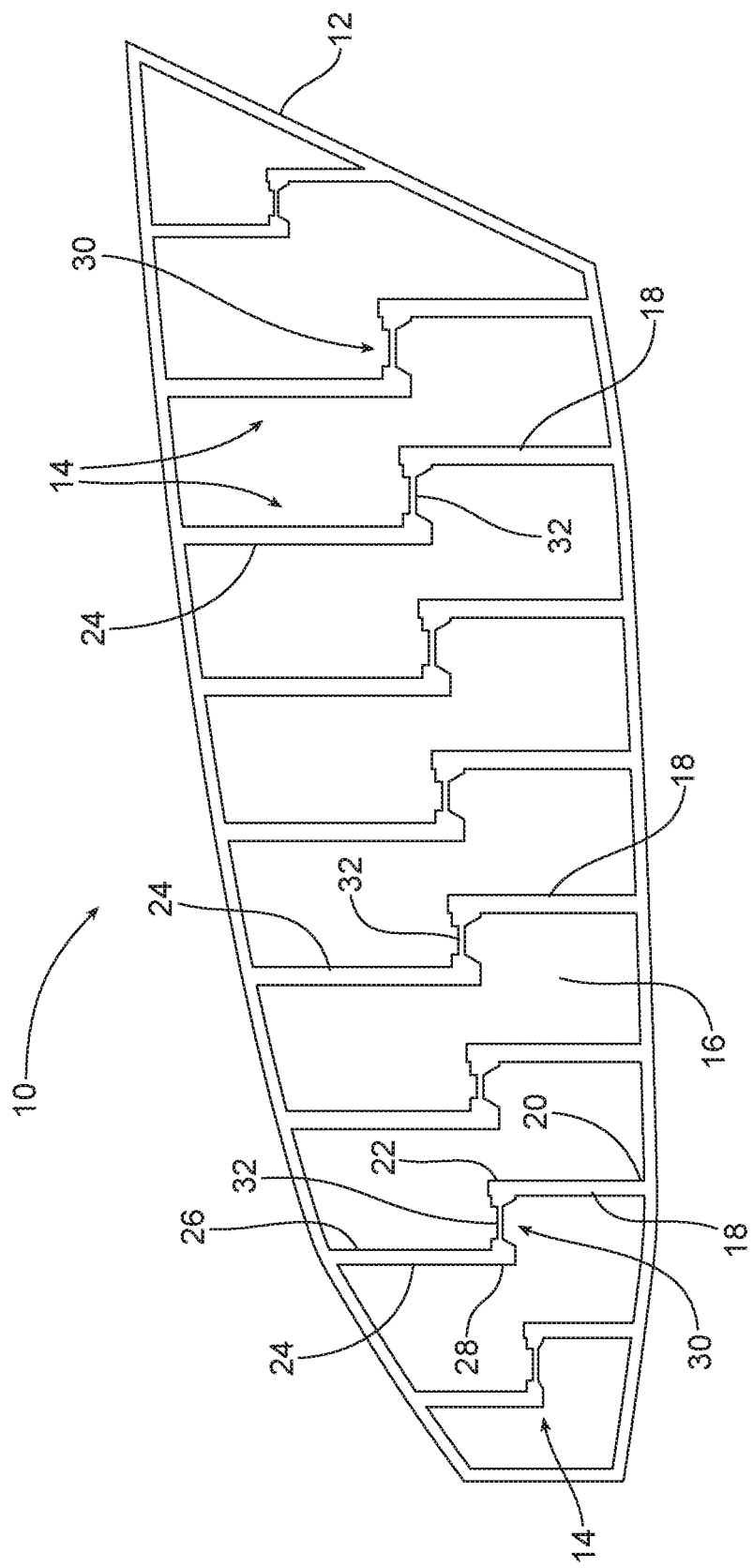

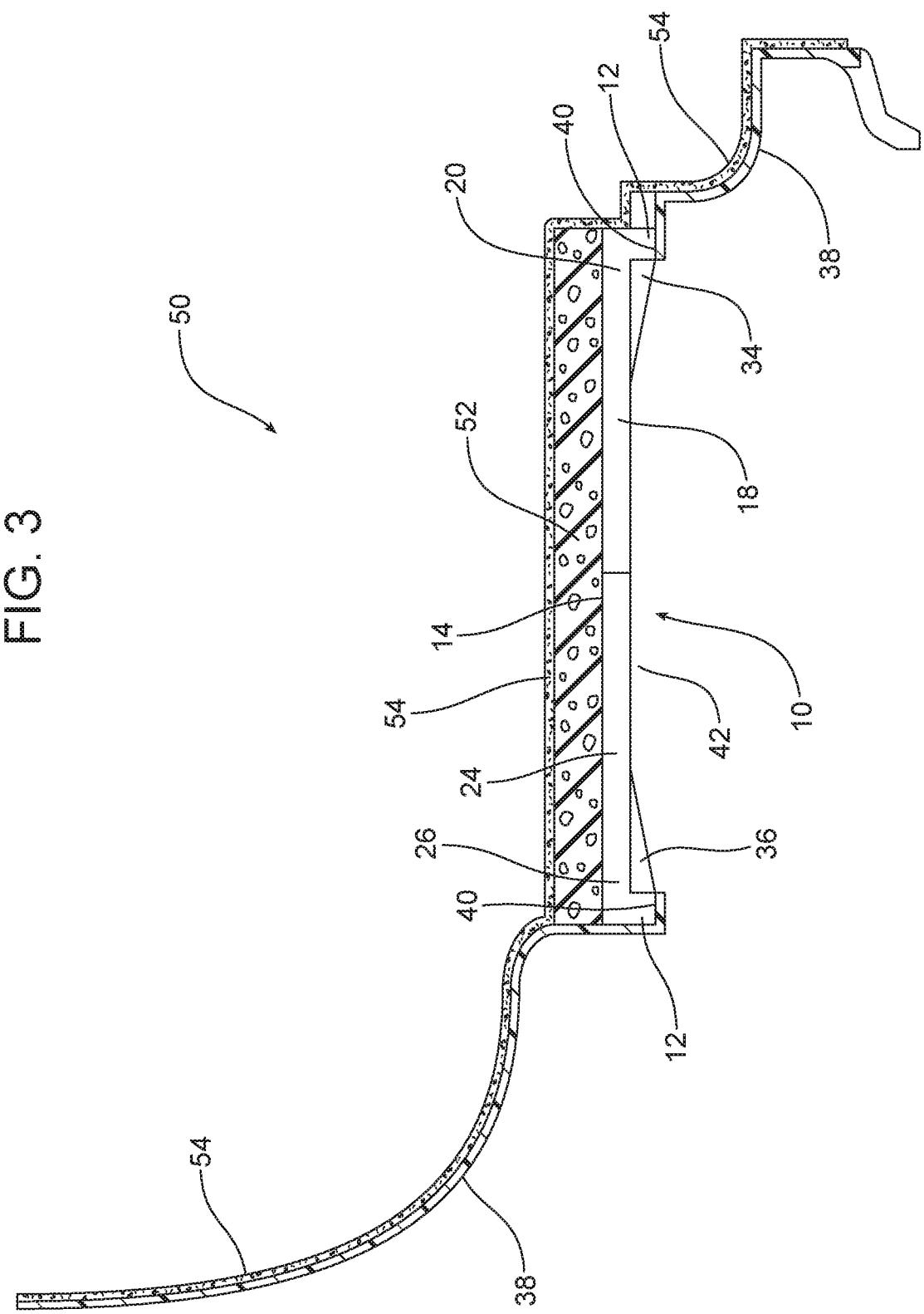

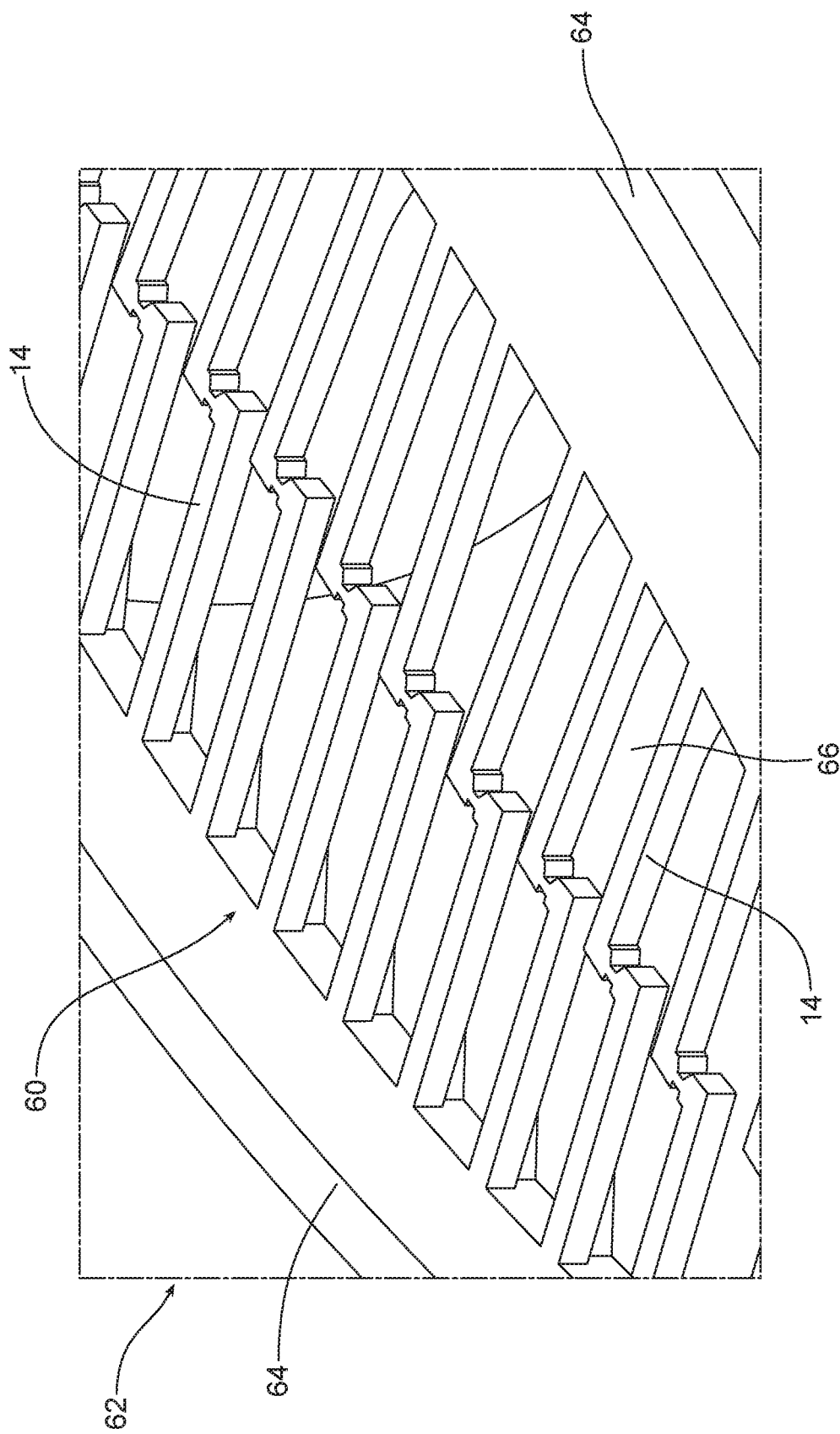

ARMREST AND SUPPORT FOR AN ARMREST ASSEMBLY

TECHNICAL FIELD

This document relates generally to the motor vehicle equipment field and, more particularly, to a new and improved support for an armrest assembly as well as to an armrest assembly incorporating that support.

BACKGROUND

Abdomen deflection is one of the critical elements taken into consideration when assessing the side impact performance of a motor vehicle. There are generally two accepted options for reducing abdomen deflection resulting from a side impact. The first is to make modifications to body structures. This can be done by increasing body side reinforcement, pillar reinforcement and/or adding or increasing the strength of an intrusion beam in the door of the motor vehicle. All such modifications to body structure add significant cost and have significant weight implications that have an adverse effect upon the fuel economy of the motor vehicle. The second option to improve side impact performance of the motor vehicle relates to the management of energy absorption through the interior door trim panel. This can be achieved with negligible cost and weight penalties to the motor vehicle. Armrest design is a particularly important aspect of this second option.

An armrest must have the necessary strength and stiffness to support vertical loads while also absorbing energy to reduce abdomen deflection resulting from lateral loads imparted by a side impact to the motor vehicle. Thus, it should be appreciated that an armrest must be designed to delicately balance between these seemingly conflicting requirements and competing functions.

This document relates to a new and improved support for an armrest assembly as well as to a new and improved armrest assembly incorporating that support. Such an armrest assembly provides enhanced compliance for both the anticipated vertical loads for proper armrest function and safety targets in the event of a side impact. The new and improved armrest weighs less due to elimination of plastic from the armrest substrate and advantageously optimizes countermeasures to save cost and weight. More particularly, the new and improved armrest assembly provides desired energy absorption that effectively eliminates the need for intensive body structure countermeasures including, for example, B pillar reinforcement, bracket reinforcement, door reinforcement and the like.

SUMMARY

In accordance with the purposes and benefits as described herein, a new and improved support is provided for an armrest. That support comprises a plurality of interconnected ribs wherein at least one rib of the plurality of interconnected ribs includes (a) a first end section having a first proximal end and a first distal end, (b) a second end section having a second proximal end and a second distal end and (c) an intermediate section connecting the first distal end and the second distal end, wherein the first end section is offset from the second end section.

More specifically, the intermediate section may include a weakened zone. That weakened zone may have a cross-sectional area of between 1% and 90% less than the first end section and the second end section of the rib.

The support may further include a first support gusset at the first proximal end of each rib. In addition, the support may include a second support gusset at the second proximal end of the or each rib. Advantageously the two gussets are provided on the underside of the or each rib thereby effectively stiffening the rib for vertical loading to better allow the support to function as an armrest under foreseeable vertical loads that might be applied during use.

Still further, the first end section, the second end section and the intermediate section of the or each rib may extend in a single plane. In addition, the support may further include a perimeter frame encompassing an opening across which the plurality of interconnected ribs extend. In yet another possible embodiment, the plurality of interconnected ribs are integrally formed with and extend across an opening provided in a body of the armrest.

In accordance with yet another aspect, a new and improved armrest assembly is provided. That armrest assembly comprises a body, and a support on the body. That support includes a plurality of interconnected ribs wherein at least one rib of the plurality of interconnected ribs includes (a) a first end section having a first proximal end and a first distal end, (b) a second end section having a second proximal end and a second distal end and (c) an intermediate section connecting the first distal end and the second distal end, wherein the first end section is offset from the second end section.

The armrest assembly may further include a cushioning layer that overlies the support on the body. Further, the armrest assembly may include a cover layer overlying the cushioning layer.

The intermediate section of the support may include a weakened zone. That weakened zone may have a cross-sectional area of between 1% and 90% less than the cross sectional area of the first end section and the second end section. Further, the intermediate section may form a first included angle of between 45 degrees and 135 degrees with the first end section and a second included angle of between 45 degrees and 135 degrees with the second end section.

The support may further include a first support gusset at the first proximal end of the or each rib. Similarly, the support may include a second support gusset at the second proximal end of the or each rib. Still further, the first end section, the second end section and the intermediate section of the or each rib may extend in a single plane.

In at least one of the many possible embodiments of the armrest assembly, the support may further include a perimeter frame encompassing an opening across which the plurality of interconnected ribs extend. In such an embodiment, the first gusset extends between the first end section and the perimeter frame and the second gusset extends between the second end section and the perimeter frame.

In another possible embodiment of the armrest assembly, the plurality of interconnected ribs are integrally formed with and extend across an opening provided in the body of the armrest. In such an embodiment the first gusset extends between the first end section and the body and the second gusset extends between the second end section and the body.

In the following description, there are shown and described several preferred embodiments of the support and the armrest assembly. As it should be realized, the support and the armrest assembly are capable of other, different embodiments and their several details are capable of modification in various, obvious aspects all without departing from support and the armrest assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the support and the armrest assembly and together with the description serve to explain certain principles thereof.

FIG. 1a is top plan view of a first possible embodiment of the support for an armrest assembly.

FIG. 3 is a schematic cross-sectional view of the complete armrest assembly incorporating the body, the support, an overlying cushioning layer and an overlying upper cover layer.

FIG. 5 is a view similar to FIG. 2 of an alternative embodiment of support and armrest assembly wherein the support is integrally formed as a part of the body of the armrest assembly.

Reference will now be made in detail to the present preferred embodiments of the support and the armrest assembly, examples of which are illustrated in the accompanying drawing figures.

DETAILED DESCRIPTION

Figure 1B:
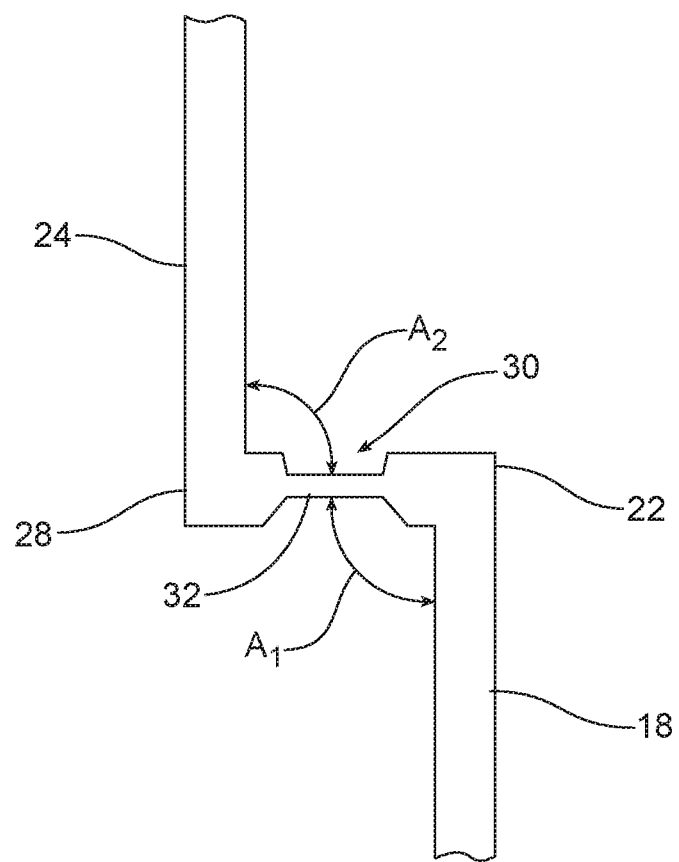
FIG. 1b is a detailed top plan view of the distal ends of the first and second end sections of a single rib illustrating the interconnection of those ends by the intermediate section of that rib.

Reference is now made to FIGS. 1a and 1b illustrating a first possible embodiment of a support 10 for an armrest. The support 10 includes a perimeter frame 12 and a plurality of interconnected ribs 14. More particularly, the embodiment of the support 10 illustrated in FIG. 1a includes nine interconnected ribs 14 that span an opening 16 encompassed by the perimeter frame 12. In the illustrated embodiment, each rib 14 of the plurality of interconnected ribs includes (a) a first end section 18 having a first proximal end 20 and a first distal end 22, (b) a second end section 24, having a second proximal end 26 and a second distal end 28 and (c) an intermediate section 30 that connects the first distal end and the second distal end together. In the illustrated embodiment, the first end section 18 is offset from the second end section 24 and the first end section, the second end section and the intermediate section 30 all extend in a single plane with the perimeter frame 12.

More particularly, as best illustrated in FIG. 1b, the intermediate section 30 forms a first included angle $A_1$ of between 45 degrees and 135 degrees with the first end section 18 and a second included angle $A_2$ of between 45 degrees and 135 degrees with the second end section 24. In addition, each intermediate section 30 in the illustrated embodiment includes a weakened zone. IN the illustrated embodiment, the weakened zone 32 has a cross-sectional area of between 1% and 90% less than the cross-sectional area of the first end section 18 and the second end section 24.

As should be appreciated, the offset first end section 18 and second end section 24 as well as the weakened zone 32 of the intermediate section 30 connecting the distal ends 22, 28 of the first and second end sections function together to provide a desired crushing action to the armrest and energy absorption to reduce abdomen deflection of an occupant in the motor vehicle in the event of a side impact as described in greater detail below.

In addition, the support 10 includes a first support gusset 34 at the first proximal end 20 of the first end section 18 and a second support gusset 36 at the second proximal end 26 of the second section 24 end of each rib 14. More particularly, the first support gusset 34 extends between the first end section 18 and the perimeter frame 12 while the second support gusset 36 extends between the second end section 24 and the perimeter frame. See FIG. 3.

Advantageously, the two support gussets 34, 36 are provided on the lower most side of the ribs 14 and function to strengthen those ribs to support higher vertical loads to which the armrest is expected to be subjected during use without adversely affecting the crushability of the support 10 and the energy absorption to be provided in the horizontal or lateral direction when an armrest incorporating the support 10 is subjected to a side impact.

Figure 2:
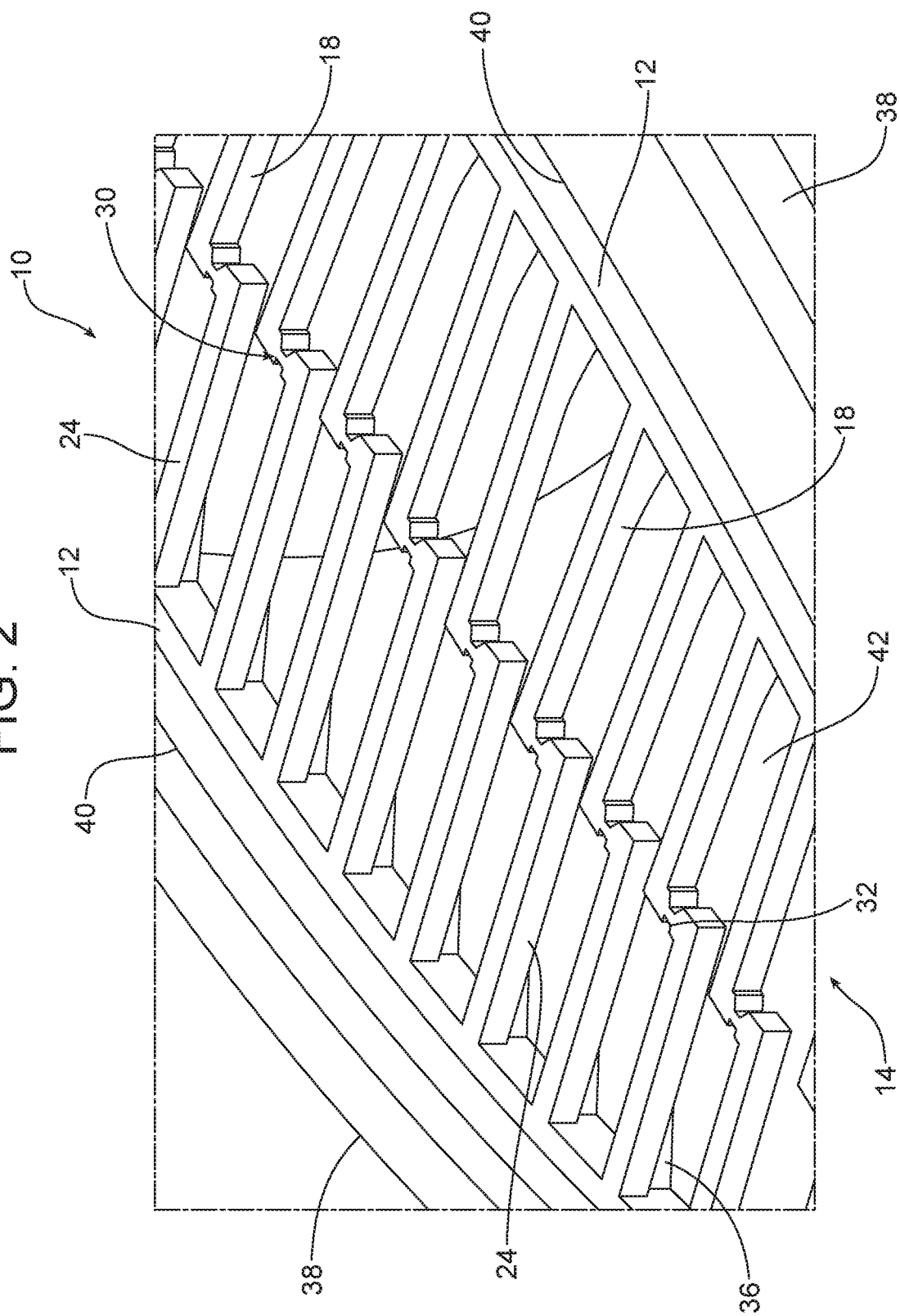
FIG. 2 is a detailed perspective view illustrating the support of FIG. 1 spanning an opening provided in the top of the body of the armrest assembly.

FIG. 2 illustrates how the support 10 illustrated in FIGS. 1a and 1b may be secured to a body 38 of an armrest assembly. As illustrated, the perimeter frame 12 of the support 10 nests in a receiver 40 formed in the body 38 with the plurality of interconnected ribs 14 spanning the opening 42 provided in the body 38.

Reference is now made once again to FIG. 3 illustrating a new and improved armrest assembly 50. That armrest assembly 50 comprises a body 38 having the receiver 40 that receives and holds the perimeter frame 12 of the support 10 with the plurality of ribs 14 of that support extending across the opening 42 formed in the body. A cushioning layer 52 of a foam rubber or other appropriate material overlies the support 10 and, thus, also extends across the opening 42. A covering layer 54 of fabric, leather or other appropriate material may be provided overlying the body 38 and the cushioning layer 52. The cover layer 54 is made from a material providing the desired aesthetic appearance and tactile sensation.

Figure 4A:
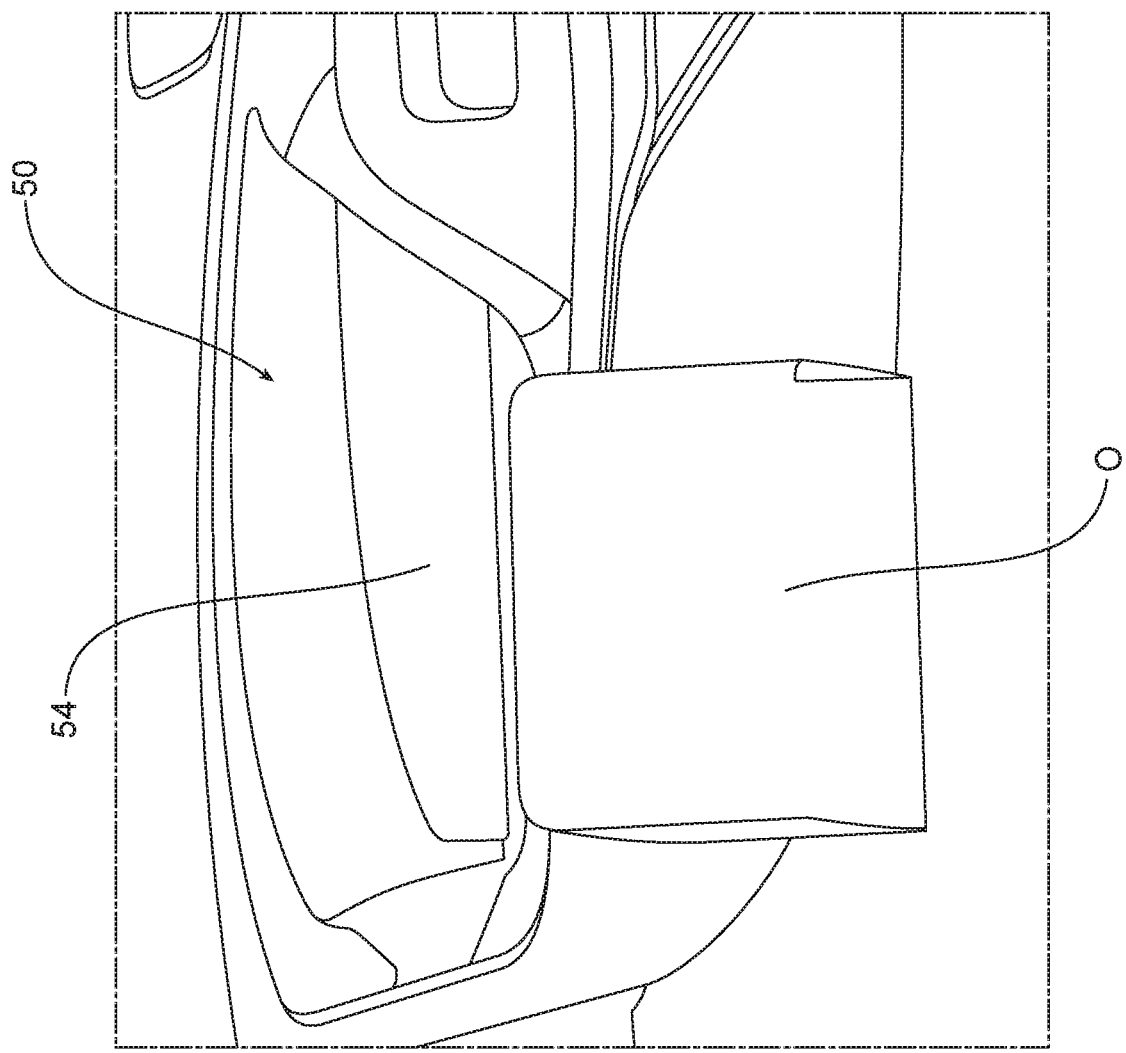
FIGS. 4a and 4b are schematic illustrations of the buckling of an armrest assembly in response to a side impact in a manner that absorbs the force of that impact and reduces abdomen deflection of the vehicle occupant.
Figure 4B:
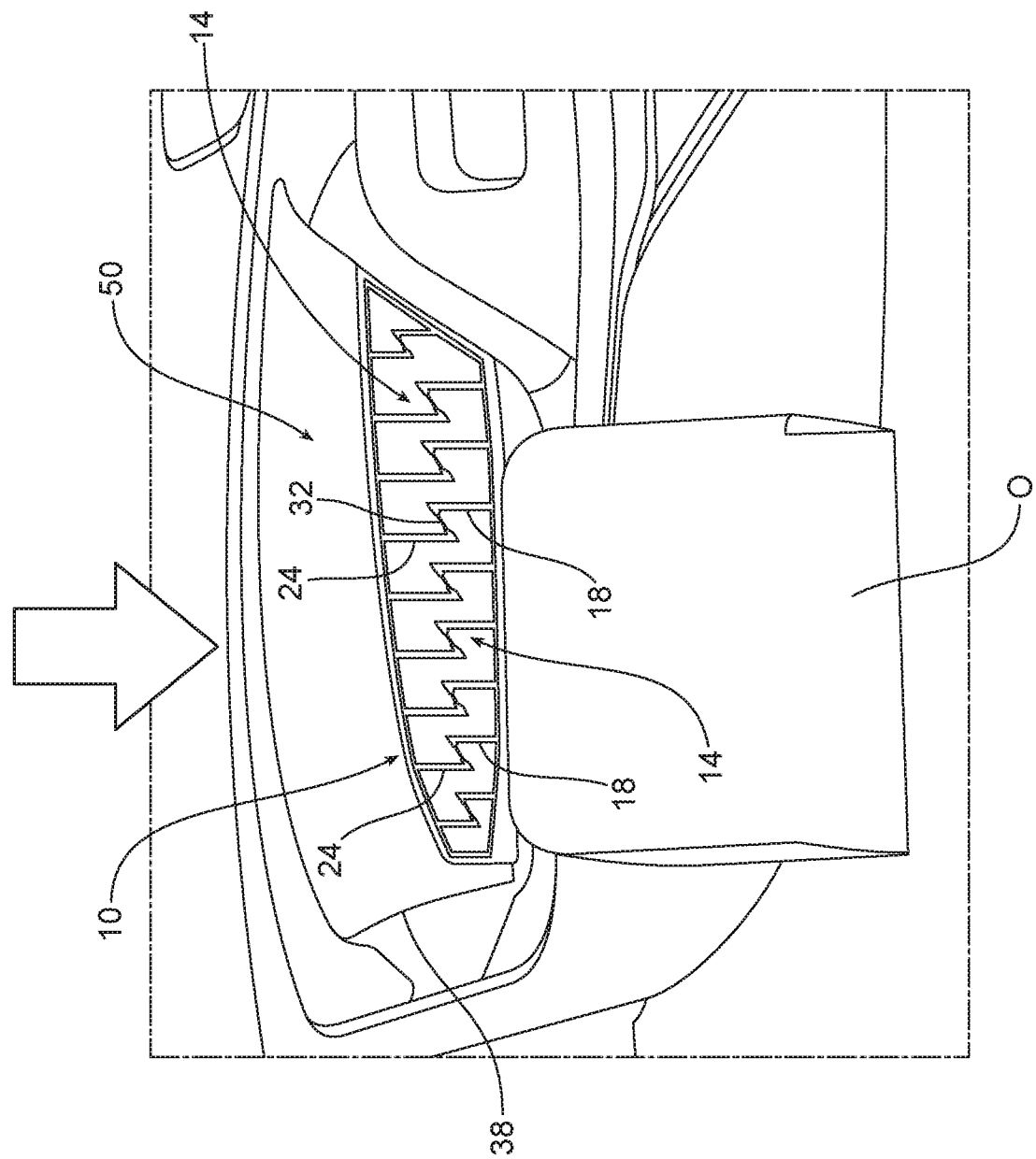

Reference is now made to FIGS. 4a and 4b which illustrate the performance of the armrest assembly 50 when subjected to a side impact. FIG. 4a illustrates the armrest assembly 50 prior to the side impact. As illustrated in FIG. 4a the body side impact has driven the door 56 incorporating the armrest assembly 50 inward toward the motor vehicle occupant O to the point where the armrest assembly 50 is just coming into engagement with the abdomen of the motor vehicle occupant O. At this point, the armrest assembly 50 has not undergone any compression and the plurality of ribs 14 in the armrest assembly 50 hidden under the cover layer 54 in FIG. 4a are oriented substantially in their normal or rest position as shown in FIG. 2.

In FIG. 4b, the armrest assembly 50 has been driven inward (note action arrow) into engagement with the abdomen of the motor vehicle occupant O. Note how the plurality of interconnected ribs 14 are bending in a designed manner along the weakened zones 32 as the armrest assembly 50 including, particularly, the support 10 are compressing to absorb the energy of the side impact and reduce the load placed upon the motor vehicle occupant O. This results in a reduction in abdomen deflection for the benefit of the motor vehicle occupant O.

FIG. 5 illustrates an alternative embodiment of a support 60 and an alternative embodiment of an armrest assembly 62 incorporating that support. As illustrated in FIG. 5, the support 60 comprises a plurality of interconnected ribs 14 that are integrally formed with the body 64 of the armrest assembly and extend across the opening 66 provided in that body.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A support for an armrest, comprising:
a plurality of interconnected ribs wherein at least one rib of said plurality of interconnected ribs includes (a) a first end section having a first proximal end and a first distal end, (b) a second end section having a second proximal end and a second distal end, (c) an intermediate section including a weakened zone, said intermediate section connecting said first distal end and said second distal end, wherein said first end section is offset from said second end section and (d) a first support gusset at said first proximal end.

2. The support of claim 1, further including a second support gusset at said second proximal end.

3. The support of claim 2, wherein said first end section, said second end section and said intermediate section extend in a single plane.

4. The support of claim 3, wherein said support further includes a perimeter frame encompassing an opening across which said plurality of interconnected ribs extend.

5. The support of claim 1, wherein said plurality of interconnected ribs are integrally formed with and extend across an opening provided in a body of said armrest.

6. An armrest assembly, comprising:
a body; and
a support on said body, said support including a plurality of interconnected ribs wherein at least one rib of said plurality of interconnected ribs includes (a) a first end section having a first proximal end and a first distal end, (b) a second end section having a second proximal end and a second distal end, (c) an intermediate section including a weakened zone, said intermediate section connecting said first distal end and said second distal end, wherein said first end section is offset from said second end section and (d) a first support gusset at said first proximal end.

7. The armrest assembly of claim 6, further including a cushioning layer overlying said support.

8. The armrest assembly of claim 7, further including a cover layer overlying said cushioning layer.

9. The armrest assembly of claim 8, further including a second support gusset at said second proximal end.

10. The armrest assembly of claim 9, wherein said first end section, said second end section and said intermediate section extend in a single plane.

11. The armrest assembly of claim 10, wherein said support further includes a perimeter frame encompassing an opening across which said plurality of interconnected ribs extend.

12. The armrest assembly of claim 11, wherein said first support gusset extends between said first end section and said perimeter frame and said second support gusset extends between said second end section and said perimeter frame.

13. The armrest assembly of claim 10, wherein said plurality of interconnected ribs are integrally formed with and extend across an opening provided in said body.

14. The armrest assembly of claim 13, wherein said first support gusset extends between said first end section and said body and said second support gusset extends between said second end section and said body.

15. The armrest assembly of claim 10, wherein said weakened zone has a cross-sectional area of between 1% and 90% less than said first end section and said second end section.

16. The armrest assembly of claim 15, wherein said intermediate section forms a first included angle of between 45° and 135° with said first end section and a second included angle of between 45° and 135° with said second end section.

* * * * *